No. 874,990. PATENTED DEC. 31, 1907.
W. H. POWELL.
MULTIPLE VOLTAGE SYSTEM OF MOTOR CONTROL.
APPLICATION FILED OCT. 19, 1905.
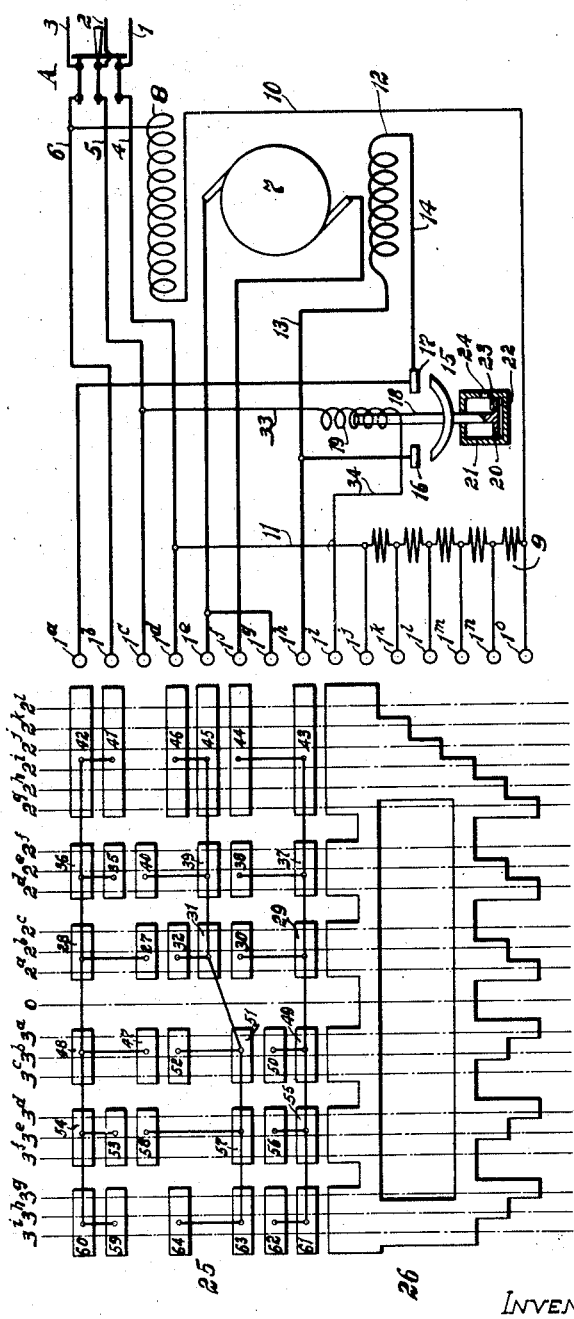
WITNESSES:
George J. Schwartz
Fred J. Kinsey.
INVENTOR:
William H. Powell.
By
Chas. E. Lord
ATTORNEY

UNITED STATES PATENT OFFICE.

WILLIAM H. POWELL, OF NORWOOD, OHIO, ASSIGNOR TO THE BULLOCK ELECTRIC MANUFACTURING COMPANY, A CORPORATION OF OHIO.

MULTIPLE-VOLTAGE SYSTEM OF MOTOR CONTROL.

No. 874,990.     Specification of Letters Patent.     Patented Dec. 31, 1907.

Application filed October 19, 1905. Serial No. 283,535.

*To all whom it may concern:*

Be it known that I, WILLIAM H. POWELL, citizen of the United States, residing at Norwood, in the county of Hamilton and State of Ohio, have invented certain new and useful Improvements in Multiple-Voltage Systems of Motor Control, of which the following is a full, clear, and exact specification.

My invention relates to controllers for electric motors and more particularly to controllers adapted to vary the speed of a motor by changing the voltage applied thereto and operated from a multiple voltage system.

In the most modern shops of all descriptions it has become the practice to employ independent electric motors for driving the various machine tools or other driven mechanisms. In connection with this class of work a wide variation of speed control is desirable and the object of my invention is to provide means for lessening the strain upon the motor and upon the gearing connecting the motor and the driven machine, upon change of speed due to the change of voltage at the armature terminals, and to produce a gradual change in speed in passing from one step to the next.

By my invention, a multiple voltage system is used, and I provide automatic means for controlling the insertion and cutting out of an auxiliary field winding. On each increase in potential at the terminals of the motor, which is normally a shunt motor, an auxiliary field winding is inserted in the circuit so that the motor will not suddenly come up to the speed corresponding to that voltage. In the preferred form of my invention, herein illustrated and described, the auxiliary field winding is a series winding and is inserted in series with the armature winding. This series winding is afterwards automatically short circuited or removed from the armature circuit and a predetermined interval of time is caused to elapse before this winding is cut out, such interval of time being of sufficient duration to allow the motor to speed up to some extent. Upon cutting out the series field winding a further increase of speed occurs which brings the armature to the speed of the next running step.

Further features of my invention will be disclosed in the following specification and accompanying drawing and the novelty thereof will be definitely set forth in the appended claims.

Reference is had to the accompanying drawing which shows a diagram of my invention.

A portion of a multiple voltage distributing system is shown at 1, 2 and 3 which is connected by a switch A to the three wire mains 4, 5 and 6 for supplying the motor with current at voltages which differ from each other; for example between the mains 4 and 5 there may be 90 volts, between mains 5 and 6, 160 volts, and between mains 4 and 6, 250 volts.

The armature of the motor, the speed of which is to be varied, is indicated at 7 and its main field winding at 8 connected in series with a variable field resistance 9. The main field winding 8 and its resistance 9 are connected across the mains 4 and 6 by conductors 10 and 11 so as to receive the full voltage of the system. An auxiliary field winding is shown at 12. This field winding is connected to contact fingers by conductors 13 and 14, which fingers are adapted to be engaged by suitable contact segments on the controller drum in such a manner that the winding will be connected in series with the motor armature for a short space of time on a change of voltage at the armature terminal, as will be explained later. A switch 15 having contacts 16 and 17 connected respectively to the conductors 13 and 14, short circuits the auxiliary winding when the switch is closed. The bridging member of this switch is attached to the soft iron core 18 of the solenoid 19. To the lower extension of said bridging members of the switch is connected a plunger 20 which works in the cylinder 21 forming a dash-pot. The plunger 20 is provided with one or more openings 22 and carries a loosely fitting disk or ring 23 which normally closes the opening 22. The cylinder 21 is provided with one or more openings 24 located at suitable distances from the closed top and bottom of the cylinder. When current passes in coil 19 the switch is raised with a comparatively slow movement, as the air passes to the bottom of the plunger only by leakage around the same. Just before the switch is closed however the plunger passes beyond the holes 24, permitting a free flow of air below it, and the switch is then closed with a sudden movement.

When no current passes in coil 19, the switch quickly falls due either to the force of gravity or spring pressure against the movable part, as preferred, the air from the plunger passing freely through the holes 22 the disk or ring being then raised from its seat.

The parts above described are interconnected and also connected to the controller fingers $1^a$, $1^b$, $1^c$ ... $1^o$ as shown. The controller cylinder or drum is provided with a large number of contacts 25, which contacts control the connections to the armature. The controller cylinder is also provided with a metallic drum 26 suitably notched and recessed, forming contacts which control the resistance in circuit with the main field winding 8. As the cylinder is revolved from the off position designated o, the fingers $1^a$, $1^b$, ... $1^o$ take the successive positions indicated by the dot and dash lines $2^a$, $2^b$, $2^c$, ... $2^l$ for forward rotation and the positions $3^a$, $3^b$, $3^c$, ... $3^l$ for backward rotation of the motor. In tracing the circuits, the switch 15 will be considered to be closed, as such is its ultimate position. Should the switch be open, the current will flow through the leads 13 and 14 and the series field winding 12 instead of going through the switch 15.

For position $2^a$ the path of the current is as follows: from main 5, contact finger $1^c$, contact 27, contact 28, finger $1^a$, switch 15, finger $1^h$, contact 29, contact 30, finger $1^f$, motor armature 7, finger $1^e$, contact 31, contact 32, finger $1^d$, to main 4, thus subjecting the armature in the lowest voltage of the system across the mains 4, 5. For position $2^a$, the field connections are from main 6, field 8, conductor 10, finger $1^o$, drum 26, finger $1^j$, conductor 11, to main 4, thus subjecting the field to the full voltage of the system, with all the resistance 9 cut out. Connection is also made through solenoid coil 19 as follows: main 5, conductor 33, solenoid coil 19, conductor 34, contact finger $1^i$, drum 26, contact finger $1^j$, conductor 11, main 4. Coil 19 is therefore subjected to the voltage across the mains 5 and 4 and switch 15 is caused to close.

For the position $2^b$, finger $1^o$ is cut out of contact with drum 26 and one section of the variable resistance 9 is inserted in the main field circuit of the motor, the field current passing from the field winding 8 through a section of the resistance 9 to contact finger $1^n$ and then to drum 26. No other changes take place, and by thus weakening the main field of the motor an increased speed is obtained. In the same way for position $2^c$ a still further weakening of the field takes place by inserting another section of resistance 9 in the field circuit and in this position current passes from the field 8 through two sections of resistance 9 to finger $1^m$ and to drum 26.

For position $2^d$ the armature connections are from main 6, to contact finger $1^b$, contact 35, contact 36, finger $1^a$, switch 15, finger $1^h$, contact 37, contact 38, finger $1^f$, motor armature 7, finger $1^e$, contact 39, contact 40, finger $1^c$, to main 5. The motor armature is therefore subjected to the voltage across the mains 6, 5 which is greater than the voltage across the mains 5, 4 across which latter mains the motor armature was connected in previous positions. The field connections and those of coil 19 are the same for this position as for position $2^a$ and the speed of the motor is increased by the increase in voltage applied to the armature. For positions $2^e$ and $2^f$ the only changes that take place are the weakening of the field by cutting in sections of resistance 9 as in positions $2^b$ and $2^c$.

For position $2^g$ the armature connections are from main 6, finger $1^b$, contact 41, contact 42, finger $1^a$, switch 15, finger $1^h$, contact 43, contact 44, finger $1^f$, motor armature 7, finger $1^e$, contact 45, contact 46, finger $1^d$, to main 4. The motor armature is therefore subjected to the greatest voltage of the system. The field connections and those of coil 19, are the same for position $2^g$ as for positions $2^a$, $2^d$, the resistance 9 being cut out, and increased speed is obtained by the increase in the voltage applied to the terminals of the motor armature.

For positions $2^h$, $2^i$, $2^j$, $2^k$, and $2^l$ the connections remain the same except that sections of resistance 9 are successively cut into the circuit of the field winding 8 until it is all in circuit, in this manner successively weakening the field for increases in speed from positions $2^g$ to $2^l$.

It will be noted that in passing from position $2^c$ to $2^d$ and from $2^f$ to $2^g$, at which times the change in voltage applied to the motor armature takes place, finger $1^i$ connected to the solenoid coil 19 is momentarily cut out of contact with the drum 26 and circuit through coil 19 is broken. At the instant finger $1^i$ breaks contact with drum 26, switch 15 drops and the auxiliary field winding 12 is inserted in series with the armature 7 of the motor, so that by the time that the increased voltage is applied to the armature, there is an increased field, which increases the counter electro-motive force and prevents a too sudden rush of current through the armature with consequent strains on the motor. Attention is called to the fact that the ohmic resistance of the coil 12 is not relied upon in choking back the current when the voltage at the armature terminals is increased, as this resistance is practically negligible in its effect upon the current flow, but as stated above an increased field strength produces the desired result. As the coil 19 is again placed in circuit at positions $2^d$ and $2^g$, the switch 15 will be closed and the auxiliary field winding 12 will be short circuited, but on account of the slow upward movement of the switch, the motor will have had sufficient time to increase in speed before the switch is closed. When the controller is moved from "off" position to the "starting" position 2ª, the switch 15 is closed in the same slow manner.

There is as great or a greater danger of injury to the gear teeth when the speed of the motor is decreased as when the speed is increased, for two reasons; first because the operator usually throws the controller handle to the "off" position quickly, thus bringing the motor to a sudden stop; and second, on account of the generator action of the motor when the potential at the armature terminals is decreased, which tends to suddenly reduce the speed of the motor. The result is that the motor tends to stop more quickly than the machine or tool to which the motor is geared, causing a hammer-blow which is liable to strip the teeth off the gears. The insertion of the series winding 12 into the armature circuit tends to reduce the generator action on a decrease in the potential at the armature terminals, as will now be explained. Assume that the motor is operated at the speed corresponding to the position 2ᵍ, with the armature terminals connected across the 250 volt mains. The counter electromotive force is less than 250 volts, say 240 volts. If the voltage at the armature terminals is decreased to 160 volts, i. e. the voltage of the mains 6—5, the counter electromotive force will be greater for a short space of time than the impressed electromotive force and the current in the armature and series field will for this space of time be reversed. The result is that there will be a differential field action. The currents in the field windings 8 and 12 will be in opposite directions causing for the moment a very weak field, which reduces to a minimum the generator action.

For reverse rotation of the motor the fingers are in positions 3ª to 3ⁱ successively. For position 3ª the current passes from main 5, finger 1ᶜ, contact 47, contact 48, finger 1ª, switch 15, finger 1ʰ, contact 49, contact 50, finger 1ᵍ, motor armature 7, finger 1ᶠ, contact 51, contact 52, finger 1ᵈ, to main 4. The armature 7 is therefore subjected to the voltage across the mains 5 and 4 and the armature current is reversed while the field is the same as for position 2ª. The direction of rotation of the motor is therefore reversed and the motor operates at its slowest speed. For positions 3ᵇ and 3ᶜ the strength of the main field 8 is weakened as before by cutting in the sections of resistance 9. For position 3ᵈ the circuit is as follows: main 6, finger 1ᵇ, contact 53, contact 54, finger 1ª, switch 15, finger 1ʰ, contact 55, contact 56, finger 1ᵍ, motor armature 7, finger 1ᶠ, contact 57, contact 58, finger 1ᵉ, and main 5. For this position, although the motor has its full field strength due to field winding 8 as in position 3ª, an increased speed is obtained for the reason that the armature is subjected to the increased voltage across the mains 6, 5. In positions 3ᵉ and 3ᶠ increased speeds are obtained by weakening the strength of the main field, by adding sections of resistance 9. For positions 3ᵍ the connections are as follows: main 6, finger 1ᵇ, contact 59, contact 60, finger 1ª, switch 15, finger 1ʰ, contact 61, contact 62, finger 1ᵍ, motor armature 7, finger 1ᶠ, contact 63, contact 64, finger 1ᵈ, and main 4. The motor is in this case subjected to the greatest voltage of the system. At positions 3ʰ and 3ⁱ the strength of field 8 is weakened by cutting in sections of the resistance 9. In passing between positions 3ᶜ and 3ᵈ and between 3ᶠ and 3ᵍ, the auxiliary field winding 12 is cut into circuit with the armature, to relieve the strain on the motor as already explained with reference to passing between positions 2ᶜ and 2ᵈ and between 2ᶠ and 2ᵍ, and is cut out again after a predetermined time. The auxiliary field winding also remains in circuit for a predetermined time after the controller is moved from position o to position 3ª.

It is seen that I have a compound wound motor, the shunt field winding only of which is normally in circuit, and the series field winding of which is automatically cut into circuit on a change of voltage, and again cut out of circuit after a predetermined interval of time has elapsed. It is therefore evident from the above description that twelve speeds forward and nine speeds in the reverse direction are obtainable.

Although I have described a specific embodiment of my invention it is evident that various modifications may be made therein without departing from the scope of the claims.

What I claim as new and desire to secure by Letters Patent is:—

1. In combination, a motor having an armature and field, means for increasing the voltage at the armature terminals, and means for simultaneously increasing the effective field windings of the motor beyond what they were just prior to making such increase in voltage.

2. In a system of control for electric motors, means for changing the potential at the motor armature terminals, means for simultaneously changing the normal field strength of the motor, and means for automatically restoring the field strength to its previous normal condition after a predetermined interval of time.

3. In combination, a motor having an armature, a main field winding and an auxiliary field winding, means for effecting changes in the potential on the leads of the armature circuit, means for cutting the auxiliary field winding into the motor circuit on a change of potential and an automatic time device for cutting said auxiliary field winding out of circuit.

4. In a switch for dynamo-electric machinery, the combination with a motor, field and armature circuits therefor, an auxiliary field winding, means for effecting a change in potential on the leads of the armature circuit, means for cutting said auxiliary winding into circuit, and an automatic time device for cutting the auxiliary winding out of circuit.

5. In a switch for dynamo-electric machinery, the combination with a motor, a main field winding and armature, circuits therefor, an auxiliary field winding, means for changing the resistance of the main field circuit and for changing the potential at the armature terminals for effecting changes in the speed of the motor, means for cutting the auxiliary field winding into circuit on a change of potential at the armature terminals, and an automatic time device for cutting the auxiliary field winding out of circuit.

6. In a multiple voltage system of control, the combination with a motor, circuits therefor, means for effecting changes in the potential on the leads of the armature circuit, means for simultaneously increasing the field strength of the motor, automatic means for decreasing the field strength of the motor, and means for delaying the action of the automatic means.

7. In a multiple voltage system, the combination with a motor, circuits therefor, an auxiliary field winding, means for effecting changes in the potential on the leads of the armature circuit, means for simultaneously cutting said auxiliary winding into circuit, automatic means for cutting the auxiliary field winding out of circuit, and a dash-pot for controlling the action of the automatic means.

8. In a multiple voltage system, the combination with a motor having an armature and a main field, an auxiliary series field winding normally out of circuit, means for effecting a change in the potential on the leads of the armature circuit, means for cutting the auxiliary field winding into the armature circuit, automatic means for cutting the auxiliary winding out of the armature circuit, and means for delaying the action of the automatic means.

9. The combination of a multiple voltage system, a motor having a field winding in its armature circuit, a shunt about the field winding, an electro-magnetically operated switch in the shunt circuit, a controller and connecting leads, said controller having contacts adapted to vary the voltage applied to the armature circuit and to control said electro-magnetically operated switch.

10. The combination of a multiple voltage system, a motor having main and auxiliary field windings, a shunt about said auxiliary winding, a switch in said shunt which normally tends to open, electro-magnetic means for controlling said switch, a controller and connecting leads, said controller having contacts adapted to vary the voltage applied to the armature circuit, and to open and close the circuit of said electro-magnetic means upon changing the voltage of the armature circuit.

11. The combination of a multiple voltage system, a motor having a main field winding and an auxiliary field winding, a shunt about the auxiliary field winding, a switch in said shunt which normally tends to open, electro-magnetic means for closing said switch, means for retarding the closing of the switch, a controller and connecting leads, said controller having contacts adapted to vary the voltage applied to the armature circuit, and to open and close the circuit of said electro-magnetic means upon changing the voltage of the armature circuit.

12. In combination, a compound wound motor, a multiple voltage distributing system for operating said motor, means for changing the voltage applied to the armature terminals, and means for simultaneously cutting into circuit a series field winding not in circuit just prior to said change.

13. In combination, a compound wound motor, a multiple voltage distributing system for operating said motor at different speeds, means for changing the armature connections to said distributing system for changes in voltage, and means for cutting into circuit on changing the armature connections a series field winding not in circuit immediately before said change.

14. In combination, a compound wound motor, a multiple voltage distributing system for operating the motor at different speeds, means for changing the voltage applied to the armature terminals, and means for automatically cutting the series field winding into circuit on a change in voltage.

15. In combination, a compound wound motor, multiple voltage distributing mains for operating the motor at different speeds, means for changing the voltage applied to the armature terminals, means for simultaneously cutting the series winding into circuit, and a time limit device for cutting the series winding out of circuit.

16. In combination, a compound wound motor, multiple voltage mains for operating the motor at different speeds, means for changing the voltage applied to the armature circuit, means for simultaneously cutting the series winding into circuit, and for cutting the series winding out of circuit after a predetermined interval of time.

17. In combination, a motor having a shunt and a series field winding, the shunt winding only being normally in circuit, means for changing the voltage applied to the armature terminals, means for automatically cutting the series winding into circuit on a change of voltage, and for cutting the said winding out of circuit after a predetermined interval of time has elapsed.

18. In combination, a compound-wound motor, and controlling means for changing the voltage impressed on the armature of the motor, for cutting the series field winding of the motor into circuit as said change in voltage is made, and for leaving said winding in circuit for a predetermined time.

19. In combination, a compound-wound motor, and controlling mechanism for changing the voltage impressed on the armature thereof and for cutting out the series field winding thereof at a predetermined time after said change in voltage is made.

20. In combination, a motor having an armature and field, and means for changing the voltage at the armature terminals and for varying the field strength at a predetermined time after the change of voltage is made.

21. In a system of control for electric motors, means for changing the potential at the motor armature terminals, and means for automatically varying the motor field strength at a predetermined time after said change of potential is made.

In testimony whereof I affix my signature, in the presence of two witnesses.

WILLIAM H. POWELL.

Witnesses:
FRED J. KINSEY,
ARTHUR F. KEVIS.